(12) United States Patent
Jang et al.

(10) Patent No.: US 11,986,137 B2
(45) Date of Patent: May 21, 2024

(54) MOBILE ROBOT

(71) Applicant: LG ELECTRONICS INC., Seoul (KR)

(72) Inventors: Jaewon Jang, Seoul (KR); Seunglok Ham, Seoul (KR); Yeongjae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 549 days.

(21) Appl. No.: 16/944,210

(22) Filed: Jul. 31, 2020

(65) Prior Publication Data

US 2021/0030234 A1 Feb. 4, 2021

(30) Foreign Application Priority Data

Jul. 31, 2019 (KR) .......................... 10-2019-0093488

(51) Int. Cl.
*A47L 11/283* (2006.01)
*A47L 11/24* (2006.01)
(Continued)

(52) U.S. Cl.
CPC ............. *A47L 11/283* (2013.01); *A47L 11/24* (2013.01); *A47L 11/4008* (2013.01);
(Continued)

(58) Field of Classification Search
CPC .... A47L 11/282; A47L 11/283; A47L 11/284; A47L 11/29; A47L 11/293; A47L 11/292;
(Continued)

(56) References Cited

U.S. PATENT DOCUMENTS 7,441,298 B2 * 10/2008 Svendsen ................ A47L 9/009
15/49.1
2002/0016649 A1 * 2/2002 Jones .................... G05D 1/0238
700/245

(Continued)

FOREIGN PATENT DOCUMENTS

EP 3 357 395 A1 8/2018
KR 10-2014-0011216 1/2014
(Continued)

OTHER PUBLICATIONS

Office Action, dated Dec. 9, 2020, issued in Korean Patent Application No. 10-2019-0093488 (5 pages).
(Continued)

*Primary Examiner* — Andrew A Horton
(74) *Attorney, Agent, or Firm* — Birch, Stewart, Kolasch & Birch, LLP (57) ABSTRACT

The present disclosure relates to a mobile robot, including: a mop module having a pair of spin mops, which rotate clockwise or counter-clockwise, and a mop motor configured to provide a driving force to the pair of spin mops; a sweep module disposed forward of and spaced apart from the mop module, and having a collecting part, which forms a collecting space to store foreign materials, a sweeping part configured to introduce foreign materials into the collecting space while rotating, and a sweeping motor configured to provide a driving force to the sweeping part; a body, on which the mop module and the sweep module are disposed; and a first floor sensor disposed forward of the sweep module, and configured to sense reflectance of light reflected from a floor.

12 Claims, 8 Drawing Sheets

(51) Int. Cl.
*A47L 11/40* (2006.01)
*B25J 11/00* (2006.01)

(52) U.S. Cl.
CPC ....... *A47L 11/4011* (2013.01); *A47L 11/4013* (2013.01); *A47L 11/4038* (2013.01); *A47L 11/4041* (2013.01); *A47L 11/4069* (2013.01); *B25J 11/0085* (2013.01)

(58) Field of Classification Search
CPC .. A47L 11/24; A47L 2201/00; A47L 2201/04; A47L 2201/06; A47L 11/4011; A47L 11/4038; A47L 11/4061; A47L 11/14; A47L 11/16; A47L 11/18; A47L 11/28; A47L 11/4013; A47L 11/4016; A47L 11/4041; B25J 9/003
See application file for complete search history.

(56) References Cited

U.S. PATENT DOCUMENTS

| | | | | |
|---|---|---|---|---|
| 2008/0276408 | A1* | 11/2008 | Gilbert, Jr. | A47L 11/4066 134/201 |
| 2013/0312215 | A1* | 11/2013 | Kim | A47L 11/20 15/347 |
| 2015/0150429 | A1* | 6/2015 | Yoo | A47L 11/4011 173/4 |
| 2018/0255997 | A1 | 9/2018 | So et al. | |
| 2019/0191952 | A1* | 6/2019 | Johnson | A47L 11/4011 |
| 2019/0204851 | A1* | 7/2019 | Afrouzi | B25J 9/1664 |
| 2019/0269290 | A1* | 9/2019 | Morita | G01B 11/10 |

FOREIGN PATENT DOCUMENTS

| | | |
|---|---|---|
| KR | 10-2017-0033579 | 3/2017 |
| KR | 10-2017-0058264 | 5/2017 |
| KR | 10-2017-0108656 | 9/2017 |
| KR | 10-2019-0015929 | 2/2019 |
| TW | 201833703 A | 9/2018 |
| WO | WO 2019/031800 A1 | 2/2019 |

OTHER PUBLICATIONS

Office Action, dated Jul. 23, 2021, issued in Taiwanese Patent Application No. 109125648 (4 pages).

* cited by examiner

MOBILE ROBOT

CROSS-REFERENCE TO RELATED APPLICATION

This application claims the benefit of priority of Korean Patent Application No. 10-2019-0093488, filed on Jul. 31, 2019 in the Korean Intellectual Property Office, the disclosure of which is incorporated herein by reference.

TECHNICAL FIELD

The following description relates to a mobile robot capable of mopping the floor.

BACKGROUND

A robot cleaner is a home appliance which performs cleaning by sucking foreign materials, such as dust and the like, from the floor. Recently, a robot cleaner capable of mopping the floor has also been developed. Such robot cleaner performs cleaning while moving autonomously.

A related art (Korean Registered Patent No. 10-1654014) discloses a robot cleaner which is moved by a mop surface. In the related art, the robot cleaner includes a first rotating member and a second rotating member, to which a pair of mop surfaces, disposed in a left to right direction, are fixed. In the robot cleaner of the related art, the first rotating member and the second rotating member are detachably connected to a robot cleaner body.

However, there is a problem in that the robot cleaner may not detect a material of the floor, and may not travel according to the material of the floor, and thus, when the robot cleaner climbs a carpet and the like while cleaning the floor, the cleaner may not escape from the carpet.

Furthermore, the robot cleaner may not detect the carpet and the like, such that when the robot cleaner is stuck in the carpet, causing a breakdown of the mop, the robot cleaner should inevitably climb the carpet, on which the cleaner cannot travel, thereby requiring a longer cleaning time.

SUMMARY

It is an object of the present disclosure to provide a mobile robot which may accurately detect a floor material, so that it is possible to prevent the mobile robot from entering beforehand an area, having a floor material which cannot be cleaned with a wet mop, or an area which makes it difficult for the mobile robot, which moves using torque of a wet mop, to escape after entering.

It is another object of the present disclosure to provide a mobile robot including an optical sensor, which is generally used to detect a cliff, and an optical flow sensor which is used to detect an amount of movement of the mobile robot, and also using the optical sensor and the optical flow sensor to measure reflectance of the floor at the same time.

It is yet another object of the present disclosure to provide a mobile robot, in which if it is difficult to accurately determine a floor material based on the reflectance of the floor, the mobile robot determines a floor material based on the reflectance of the floor along with load information of the sweeping part and/or load information of the spin mop.

In order to achieve the above objects, the present disclosure is characterized in that a floor material is detected based on light reflectance of the floor and/or load of the sweeping part.

The present disclosure is characterized in that a floor material is detected based on at least one of the light reflectance of the floor, the load of the sweeping part, and the load of the spin mop.

Further, in accordance with an aspect of the present disclosure, the above and other objects can be accomplished by providing a mobile robot, including: a mop module having a pair of spin mops, which rotate clockwise or counter-clockwise, and a mop motor configured to provide a driving force to the pair of spin mops; a sweep module disposed forward of and spaced apart from the mop module, and having a collecting part, which forms a collecting space to store foreign materials, a sweeping part configured to introduce foreign materials into the collecting space while rotating, and a sweeping motor configured to provide a driving force to the sweeping part; a body, on which the mop module and the sweep module are disposed; and a first floor sensor disposed forward of the sweep module, and configured to sense reflectance of light reflected from a floor.

The mobile robot may further include a second floor sensor, which is disposed between the sweep module and the pair of spin mops and is configured to sense reflectance of the light reflected from the floor.

The first floor sensor may sense a distance from the floor.

The first floor sensor may include a laser sensor or an infrared sensor.

The second floor sensor may include an optical flow sensor configured to detect an amount of movement of the mobile robot based on an image of the floor.

In addition, the mobile robot may further include a controller configured to control the sweeping motor and the mop motor, wherein the controller determines an entry restriction condition based on a first light reflectance value sensed by the first floor sensor, and in response to the entry restriction condition being satisfied, the controller controls the mop motor to perform a motion corresponding to entry restriction.

The entry restriction condition may be satisfied if the first light reflectance value is smaller than a predetermined reference reflectance value.

Moreover, the mobile robot may further include the controller configured to control the sweeping motor and the mop motor, wherein the controller determines an entry restriction condition based on the first light reflectance value sensed by the first floor sensor and a second light reflectance value sensed by the second floor sensor, and in response to the entry restriction condition being satisfied, the controller controls the mop motor to perform the motion corresponding to entry restriction.

The entry restriction condition may be satisfied if the first light reflectance value and the second light reflectance value are smaller than a predetermined reference reflectance value.

Furthermore, the mobile robot may further include: the controller configured to control the sweeping motor and the mop motor; and a first load information sensor configured to sense a load value of the sweeping motor, wherein the controller determines an entry restriction condition based on the first light reflectance value sensed by the first floor sensor and a first load value sensed by the first load information sensor, and in response to the entry restriction condition being satisfied, the controller controls the mop motor to perform the motion corresponding to entry restriction.

The entry restriction condition may be satisfied if the first light reflectance value is smaller than a predetermined reference reflectance value, or if the first load value is smaller than a predetermined first reference load value.

The entry restriction condition may be satisfied if the first light reflectance value is smaller than the predetermined reference reflectance value, and if the first load value is greater than the predetermined first reference load value.

In addition, the mobile robot may further include: the controller configured to control the sweeping motor and the mop motor; the first load information sensor configured to sense the load value of the sweeping motor; and a second load information sensor configured to sense a load value of the mop motor, wherein the controller determines an entry restriction condition based on the first light reflectance value sensed by the first floor sensor, the first load value sensed by the first load information sensor and a second load value sensed by the second load information sensor, and in response to the entry restriction condition being satisfied, the controller controls the mop motor to perform the motion corresponding to entry restriction.

The entry restriction condition may be satisfied in at least one of a case where the first light reflectance value is smaller than the predetermined reference reflectance value, a case where the first load value is greater than the predetermined first reference load value, and a case where the second load value is greater than a predetermined second reference load value.

The entry restriction condition may be satisfied if the first light reflectance value is smaller than the predetermined reference reflectance value, if the first load value is greater than the predetermined first reference load value, and if the second load value is greater than the predetermined second reference load value.

The pair of spin mops may be symmetrical to each other with respect to a virtual central vertical plane.

At least a portion of the first floor sensor may vertically overlap the virtual central vertical plane.

At least a portion of the first floor sensor and the second floor sensor may vertically overlap the virtual central vertical plane.

The sweep module may be disposed in a base which forms a bottom surface of the body, and may be disposed in an inner region of the base which is defined as an inner region of an edge of the base.

The collecting part may be disposed forward of the sweeping part.

As described above, the present disclosure has an effect in that the mobile robot determines an area, in which the floor has a low reflectance, as a carpet area, and avoids the area while traveling, thereby solving the problem of having difficulty in escaping from a carpet when the mobile robot, which moves using torque of a wet mop, climbs the carpet.

Further, by using a plurality of sensors, the mobile robot may estimate a floor material based on at least one of factors of the reflectance of the floor, the load of the sweeping part, and the load of the spin mop or by combining these factors, thereby accurately determining the floor material.

In addition, the present disclosure provides the first floor sensor and the second sensor, which perform existing functions of sensing a cliff and an amount of movement of the mobile robot, and at the same time perform the function of determining the floor material. Accordingly, there is no need to provide a separate sensor, thereby reducing production costs and facilitating a control configuration.

Furthermore, the present disclosure has an effect in that the first floor sensor is disposed forward of the sweep module and the mop module, such that the sweep module and the mop module may avoid a carpet preemptively before load is increased due to the carpet and the like.

Moreover, the present disclosure has an effect in that a sensor for measuring light reflectance of the floor is disposed on a center line in back-and-forth direction thereby securing a maximum sensing range with a minimum number of sensors.

DETAILED DESCRIPTION

In the following description, the terms indicating directions, such as "front (F)," "rear (R)," "left (Le)," "right (RI)," "up (U)," "down (D)," and the like, are defined as illustrated in the drawings. These terms, however, are used merely to provide a better understanding of the present disclosure, and it is apparent that the directions can be defined differently by difference references.

For example, a direction parallel to a virtual line, formed by connecting central axes of a left spin mop and a right spin mop, is defined as a left-and-right direction; a direction, which vertically intersects with the left-and-right direction, and is parallel to the central axes of the spin mops or is at an included angle of less than 5 degrees, is defined as an up-and-down direction; and a direction, which vertically intersects with the left-and-right direction and the up-and-down direction, is defined as a back-and-forth direction.

The terms, "first," "second," "third," etc., used in this disclosure, do not necessarily denote any order, importance, or hierarchy, but rather the terms are used to merely distinguish one element from another. For example, an embodiment may be configured to include only a second element without a first element.

Also, the singular forms are intended to include the plural forms as well, unless the context clearly indicates otherwise.

The term "floor cloth" used herein may be made of various materials, such as fabric or paper, and may be intended for repetitive use by washing or for one-time use.

Figure 1:
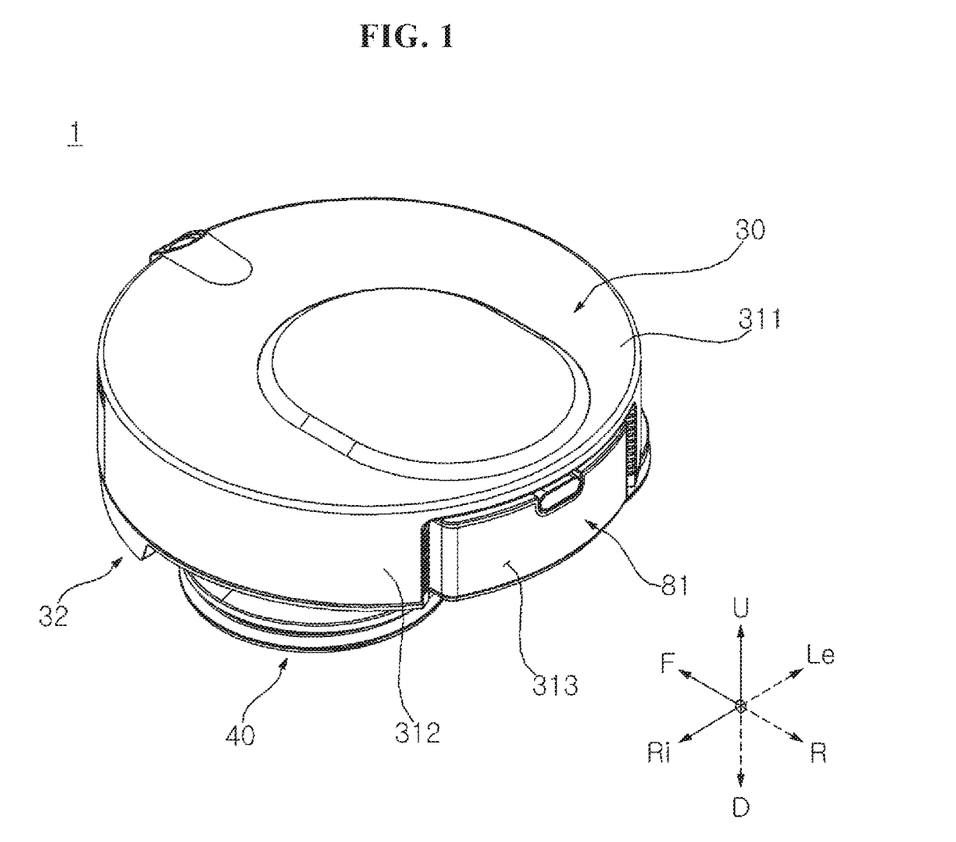
FIG. 1 is a perspective view of a cleaner according to a first embodiment of the present disclosure.
Figure 2:
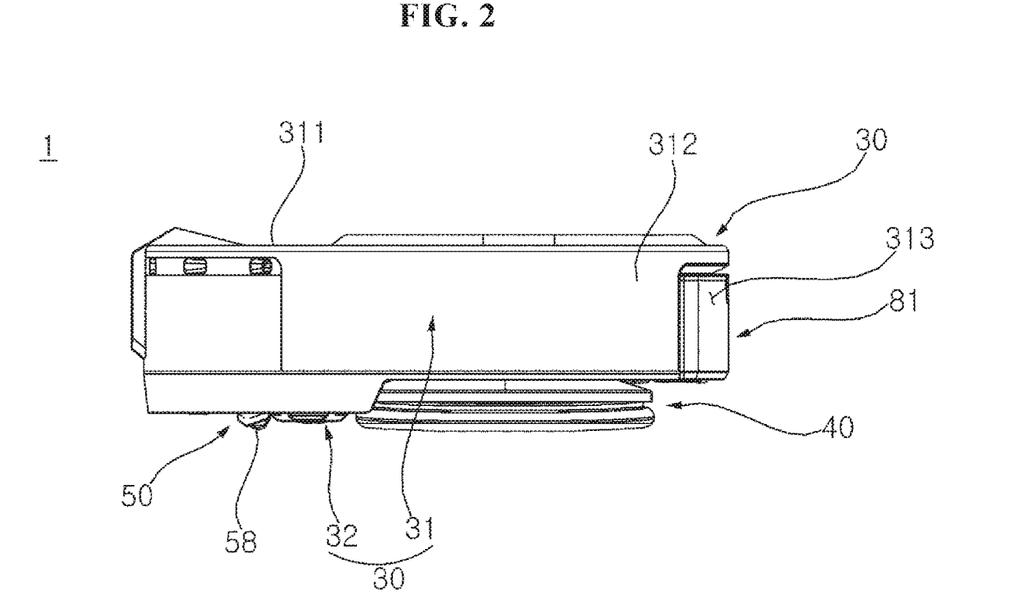
FIG. 2 is a left side view of the cleaner of FIG. 1.
Figure 3:
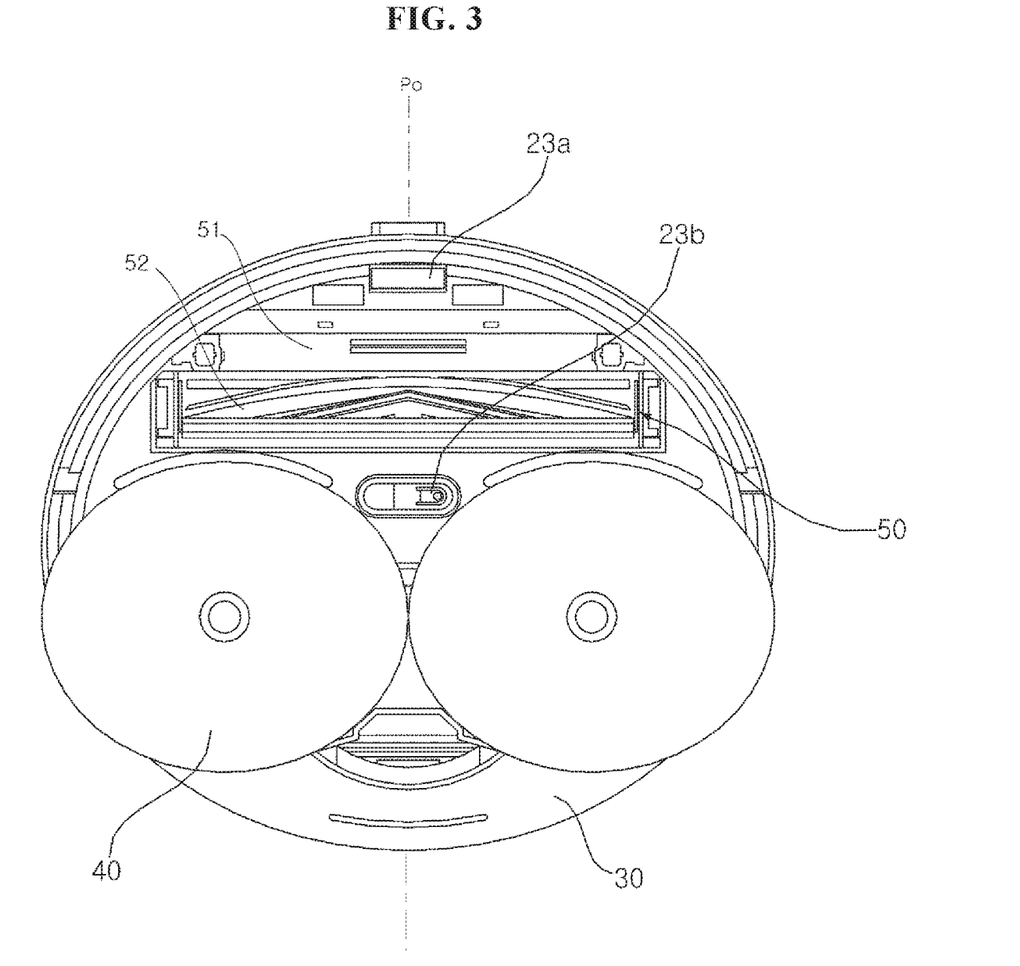
FIG. 3 is a bottom view of the cleaner of FIG. 1.

Hereinafter, a cleaner 1 according to embodiments of the present disclosure will be described with reference to FIGS. 1 to 3.

The cleaner 1 according to the embodiments of the present disclosure mops a floor. The cleaner 1 may travel autonomously. The cleaner 1 according to an embodiment of the present disclosure includes a body 30 including a controller. The robot cleaner 1 includes a mop module configured to mop a floor while being in contact with the floor (surface to be cleaned). The robot cleaner 1 includes a sweep module 50 configured to collect foreign materials from the floor.

The mop module is disposed on a lower side of the body 30 and supports the body 30. The sweep module 50 is disposed on a lower side of the body 30 and supports the body 30. In the embodiment, the body 30 is supported by the mop module and the sweep module 50. The body 30 forms an exterior of the robot cleaner 1. The body 30 is disposed to connect the mop module and the sweep module 50.

The mop module may form an exterior. The mop module is disposed on a lower side of the body 30 and at the rear of the sweep module 50. The mop module provides a driving force for movement of the cleaner 1. In order to move the cleaner 1, the mop module is preferably disposed at the rear of the robot cleaner 1. The mop module includes at least one floor cloth (not shown) which wipes the floor while rotating. The mop module includes at least one spin mop 40, which when viewed from the top, rotates clockwise or counter-clockwise. The spin mop 40 is in contact with the floor.

In the embodiment, the mop module includes a pair of spin mops 40. The pair of spin mops 40 rotate clockwise or counter-clockwise when viewed from above, and mops the floor while rotating. Of the pair of the spin mops 40, a spin mop, which is located at the left side when viewed from the front in a traveling direction of the robot cleaner 1, is defined as a left spin mop 40, and a spin mop located at the right side is defined as a right spin mop 40.

Each of the left spin mop 40 and the right spin mop 40 rotates about a rotation axis. The rotation axis is disposed vertically. The left spin mop 40 and the right spin mop 40 may rotate independently of each other. The pair of spin mops 40 and 40 may be symmetrical to each other with respect to a virtual central vertical plane Po.

The sweep module 50 may form an exterior. The sweep module 50 is disposed at the front of the mop module. In order to prevent the mop module from first coming into contact with foreign materials on the floor, the sweep module 50 is preferably disposed at the front in a traveling direction of the cleaner 1.

The sweep module 50 is disposed in a base 32 which forms a bottom surface of the body 30. The sweep module 50 is disposed in an inner region of the base 32 which is defined as an inner region of an edge of the base 32. That is, the sweep module 50 fully overlaps vertically with the inner region of the base 32, such that the sweep module 50 may be covered by the base 32.

A collecting part 51 is disposed forward of the sweeping part 52. The base 32 has a circular shape when viewed from the top. The base 32 having a circular shape has an advantage in that the mobile robot may readily change directions.

However, in the case where the base 32 has a circular shape, there is a drawback in that if a horizontal width of the sweeping part 52 increases, the sweeping part 52 protrudes outside of the base 32, and if the width of the sweeping part 52 is reduced too much, a width of a cleaning range at one time becomes narrower. Accordingly, in the present disclosure, the collecting part 51 is disposed forward of the sweeping part 52, a horizontal length of the collecting part 51 is smaller than a horizontal length of the sweeping part 52, and the collecting part 51 is disposed adjacent to the edge of the base 32, such that a slim structure may be provided, in which the sweep module 50 does not protrude from the base 32 without reducing the length of the sweeping part 52.

Figure 4:
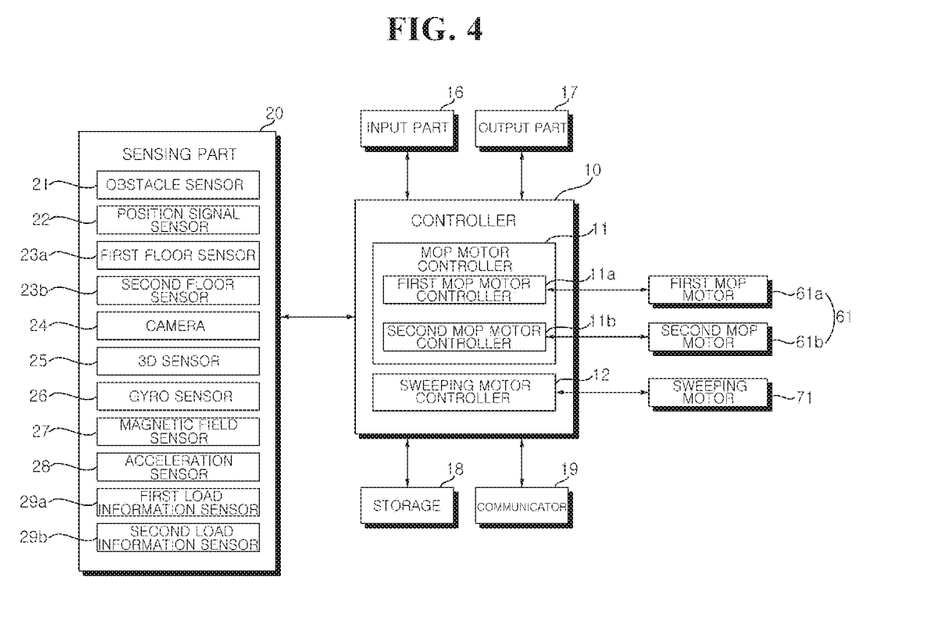
FIG. 4 is a control block diagram illustrating a robot cleaner 1 and 1 according to embodiments of the present disclosure.

Referring to FIG. 4, a sensing part 20 is included, which senses a variety of information related to the motion or state of a robot cleaner 1 and 1', or external circumstances thereof.

The sensing part 20 may include an obstacle sensor 21 for sensing an external obstacle which is spaced apart from the robot cleaner 1 and 1'. A plurality of obstacle sensors 21 may be provided. The obstacle sensor 21 includes the obstacle sensors 21 for sensing front obstacles. The obstacle sensor 21 includes the obstacle sensor 21 for sensing left and right obstacles. The obstacle sensor 21 may be disposed at the body 30. The obstacle sensor 21 may include an infrared sensor, an ultrasonic sensor, an RF sensor, a geomagnetic sensor, a Position Sensitive Device (PSD) sensor, and the like.

The sensing part 20 may include a position signal sensor 22 for determining a position by receiving an identification signal from an external source. For example, the position signal sensor 22 may be an Ultra-Wide Band (UWB) sensor using an Ultra-Wide Band (UWB) signal. The controller 10 may identify the position of the robot cleaner 1 and 1' based on the signal received by the position signal sensor 22.

The external identification signal is a signal transmitted by an external signal generator, such as a beacon located at an external position and the like. A plurality of signal generators may be provided at positions which are spaced apart from each other. Accordingly, the position signal sensor 22 may receive identification signals transmitted from signal generators positioned at different places.

The sensing part 20 may include a first floor sensor 23a for sensing the presence of a cliff on the floor. The first floor sensor 23a may sense the presence of a cliff located forward or rearward of the robot cleaner 1 and 1'. The first floor sensor 23a may sense a distance from the floor. If a distance from the floor is greater than a predetermined distance, the controller 10 determines that there is a cliff, and may control the robot cleaner 1 and 1' to perform a motion in response to the determination.

For example, the first floor sensor 23a may include an optical sensor, and the optical sensor may include a laser sensor or an infrared sensor. The first floor sensor 23a may include a light emitter (not shown) for emitting light onto the floor, and a light receiver for receiving light reflected from the floor. The first floor sensor 23a may measure a distance based on a time difference between the emitted light and the light returning to the light receiver.

Further, the first floor sensor 23a may sense reflectance of light reflected from the floor. Specifically, by measuring an amount, illuminance, and the like of the returning light, the light receiver may obtain reflectance of the returning light compared to the light emitted by the light emitter. By sensing reflectance of light reflected from the floor, the first floor sensor 23a may provide the controller with a means for detecting a material of the floor.

The first floor sensor 23a may be disposed forward of the sweep module 50. As the first floor sensor 23a is disposed forward of the sweep module 50, the sweep module 50 may avoid a carpet preemptively before load is increased due to the carpet and the like.

The sensing part 20 may include a second floor sensor 23b which detects an amount of movement of the mobile robot based on a floor image. The second floor sensor 23b may sense reflectance of light reflected from the floor. Alternatively, the second floor sensor 23b may detect reflectance (roughness) of the floor based on image quality information.

For example, the second floor sensor 23b may include an optical flow sensor. The optical flow sensor generates image data in a predetermined format by converting a lower image input from an image sensor included in the optical flow sensor. The generated image data may be transmitted to the controller.

In addition, one or more light sources may be installed adjacent to the optical flow sensor. The one or more light sources may emit light to a predetermined area of a floor surface, images of which are captured by an image sensor. That is, when the mobile robot travels in a specific area along the floor surface, if the floor surface is a flat surface, a predetermined distance may be maintained between the image sensor and the floor surface.

By contrast, if the mobile robot moves on an uneven floor surface, a distance therebetween becomes longer due to unevenness and an obstacle CA on the floor surface. In this case, the controller may control the one or more light sources to adjust an amount of the emitted light. The light sources may be a light emitting element, e.g., a light emitting diode (LED) and the like.

By using the optical flow sensor, the controller may detect the position of the mobile robot regardless of slipping of the mobile robot. The controller may calculate a distance and direction of movement by comparing and analyzing the image data, captured by the optical flow sensor, according to elapsed time, and may calculate the position of the mobile robot based on the calculation. By using image information on a lower part of the mobile robot, which is obtained using the optical flow sensor, the controller may perform calibration, which is robust to slipping, on the position of the mobile robot which is calculated by other means.

The second floor sensor 23b may provide a means for detecting a material of the floor by sensing reflectance of light reflected from the floor or by analyzing an image of the floor.

The second floor sensor 23b may be disposed between the sweep module 50 and the pair of spin mops. The second floor sensor 23b may be disposed so that at least a portion of the second floor sensor 23b may vertically overlap the central vertical plane. Specifically, on the central vertical plane, the second floor sensor 23b is interposed between a line, formed by connecting central axes of the pair of spin mops, and the sweeping part 52.

When the second floor sensor 23b is disposed forward of the mop module 40, the mop module may avoid a carpet preemptively before load is increased due to the carpet and the like.

Accordingly, even when only one second floor sensor 23b is used, rather than using a plurality of second floor sensors 23b, the second floor sensor 23b may detect a material of the floor in front of the pair of spin mops, since the second floor sensor 23b is disposed at a position leaning forward from the center of the body 30.

Further, the present disclosure has an effect in that while performing existing functions of detecting a cliff and an amount of movement of the mobile robot, the first floor sensor 23a and the second floor sensor 23b may also detect a material of the floor.

The sensing part 20 may include a camera 24 for sensing an external image. The camera 24 may be disposed at the body 30, and may sense an upper image of the body 30.

The sensing part 20 may include a 3D sensor 25 for sensing three-dimensional (3D) position information of an external environment.

For example, the 3D sensor 25 may include: a light emitter (not shown) for emitting infrared light; and a 3D camera (3D Depth Camera, not shown) for sensing the infrared light reflected from an external object. The light emitter may also emit infrared light having a predetermined pattern. The 3D camera may be an IR camera, an RGB-Depth camera, and the like. Such 3D sensor 25 may be implemented using a time-of-flight (TOF) scheme.

In another example, the 3D sensor 25 may be implemented by using stereo vision techniques, in which 3D coordinate information is generated by combining two or more images acquired using two or more cameras.

The sensing part 20 may include a slope information obtainer (not shown) for obtaining slope information on a floor (H) of the body 30. For example, the slope information obtainer may include a gyro sensor 26. The slope information obtainer may include a processing module (not shown) for converting a sensing signal of the gyro sensor 26 into slope information. The processing module, which is provided as part of the controller 10, may be implemented using an algorithm or a program. In another example, the slope information obtainer may include a magnetic field sensor 27, and may obtain slope information based on sensing information on the magnetic field of the earth.

Here, the floor (H) refers to a horizontal plane, and a plane which is perpendicular to the direction of gravity. The gyro sensor 26 may obtain information on a rotating angular speed with respect to a horizontal plane of the body 30. Specifically, the gyro sensor 26 may sense a rotating angular speed around the X-axis and the Y-axis which are parallel to the horizontal plane and mutually cross at right angles. The rotating angular speed in a horizontal plane may be calculated by synthesizing a rotating angular speed (roll) around the X-axis and a rotating angular speed (pitch) around the Y-axis using the processing module. A slope value may be calculated by integrating the rotating angular speed using the processing module.

The gyro sensor 26 may sense a determined reference direction. The slope information obtainer may obtain slope information based on the reference direction.

The gyro sensor 26 may have a gyro sensing function for three axes in a space coordinate system which mutually cross at right angles. Information collected by the gyro sensor 26 may include roll, pitch and yaw information. The processing module may calculate a direction angle of the robot cleaner 1 and 1' by integrating roll, pitch and yaw angular speeds.

The gyro sensor 26 is preferably disposed at the body 30. Accordingly, the gyro sensor 26 is disposed in a remaining part Q, which will be described later, and in which the body 30 is included. Further, the slope information obtainer is disposed in the remaining part Q.

The gyro sensor 26 may be implemented as a separate sensor, or may function as part of an IMU sensor which will be described later.

The sensing part 20 may include the magnetic field sensor 27 for sensing the magnetic field. The magnetic field sensor 27 may have a magnetic field sensing function for three axes in a space coordinate system which mutually cross at right angles. The magnetic field sensor 27 may measure a direction angle (azimuth). The magnetic field sensor 27 may be implemented as a separate sensor, or may function as part of an IMU sensor which will be described later.

The sensing part 20 may include an acceleration sensor 28 for sensing the gravity of the robot cleaner 1 and 1'. The acceleration sensor 28 may provide an acceleration sensing function for three axes in a space coordinate system which mutually cross at right angles. The acceleration sensor 28 may be implemented as a separate sensor, or may function as part of an IMU sensor which will be described later.

The cleaner 1 may include an inertial sensor unit (IMU, not shown). Based on information of the inertial sensor unit, the robot cleaner 1 may stabilize traveling motions of the robot cleaner 1. The IMU may function as the gyro sensor 26, the magnetic field sensor 27, and the acceleration sensor 28.

The sensing part 20 may include a first load information sensor 29a for obtaining load information (load value) of a sweeping motor 71.

For example, the first load information sensor 29a may sense load on a mop motor 61 by sensing a motor load current value, a motor load voltage value, or the like of the sweeping motor 71. Specifically, a second load information sensor 29b may be implemented using a current detector included in a mop motor controller 11.

In another example, the first load information sensor 29a may be provided with an encoder which senses a rotation speed or a number of rotations of the sweeping part 52. Specifically, as the load applied on the sweeping part 52 increases, the rotation speed is reduced compared to a rotation signal (current value, voltage value, etc.) applied on the sweeping motor 71. In this case, load information may be obtained by using the encoder which senses rotation speed information.

The sensing part 20 may include a second load information sensor 29b for obtaining load information of the mop motor 61.

For example, the second load information sensor 29b may sense load on the mop motor 61 by sensing a motor load current value, a motor load voltage value, and the like of the mop motor 61. Specifically, the second load information sensor 29b may be implemented using the current detector included in the controller 11 of the mop motor 61.

In another example, the second load information sensor 29b may be provided with an encoder which senses a rotation speed or a number of rotations of the spin mop. Specifically, as the load applied on the floor cloth increases, the rotation speed is reduced compared to a rotation signal (current value, voltage value, etc.) applied on the mop motor 61. In this case, load information may be obtained by using the encoder which senses rotation speed information.

The sensing part 20 may include an impact sensor (not shown) for sensing contact with an external obstacle. The impact sensor may be implemented by using a bumper (not shown) which is pressed by an external object.

The sensing part 20 may include an encoder (not shown) which recognizes an actual moving path of the robot cleaner 1 and 1'. The function of the encoder may also be performed by an auxiliary wheel 58.

The robot cleaner 1 and 1' includes an input part 16 which inputs a user's various instructions. The input part 16 may include a button, a dial, a touch-type display, and the like. The input part 16 may include a microphone (not shown) for voice recognition, and a power switch 16a for switching ON and OFF the power supply.

The robot cleaner 1 and 1' includes an input part 16 which inputs a user's various instructions. The input part 16 may include a button, a dial, a touch-type display, and the like. The input part 16 may include a microphone (not shown) for voice recognition, and a power switch for switching ON and OFF the power supply.

The robot cleaner 1 and 1' includes a storage 18 for storing a variety of information. The storage 18 may include a volatile or non-volatile recording medium. The storage 18 may store algorithms for controlling various motions of the robot cleaner 1 and 1' to respond to errors.

The storage 18 may include a map of a traveling area. The map may be input by an external terminal which may exchange information through a communicator 19, or the robot cleaner 1 and 1' may generate the map by learning by itself. In the former case, examples of the external terminal may include a remote control, a PDA, a laptop computer, a smartphone, a tablet PC, and the like, in which an application for setting up the map is installed.

The robot cleaner 1 and 1' may include the communicator 19 which may access a predetermined network. The communicator 19 may be implemented using wireless communication techniques, such as IEEE 802.11 WLAN, IEEE 802.15 WPAN, UWB, Wi-Fi, Zigbee, Z-wave, Blue-Tooth, and the like, according to a communication protocol.

The cleaner 1 includes a controller 10 for controlling autonomous traveling. The controller 10 may be implemented on a main PCB (Co) disposed in the body 30.

The controller 10 may process a signal of the input part 16 or a signal input through the communicator 19.

The controller 10 may control traveling of the robot cleaner 1 and 1' by receiving a sensing signal of the sensing part 20. The controller 10 may control the sweeping motor 71 and the mop motor 61 by receiving a sensing signal of the sensing part 20.

The controller 10 may control a water supply module. The controller 10 may control a pump for adjusting an amount of supplied water. By controlling the pump, the controller 10 may adjust an amount of water per hour which is supplied to the top module 40. In another example, the controller 10 may control a value, which will be described later, to change whether to supply water.

The controller 10 may learn a traveling area by using images captured by the camera 24, and may recognize a current position. The controller 10 may be configured to map the traveling area through the images, and may recognize the current position on the map. The images captured by the camera 24 may be used to generate the map of the traveling area and to recognize the current position in the traveling area. For example, the controller 10 may generate the map of the traveling area by using an image of a boundary between a ceiling and a side surface, among upward images captured by the camera 24. Further, the controller 10 may sense the current position in the traveling area based on feature points of the images.

The controller 10 may control the robot cleaner 1 and 1' to return to a charging stand after traveling.

For example, the robot cleaner 1 and 1 may be configured to return to the charging stand by sensing an infrared (IR) signal and the like transmitted from the charging stand. The controller 10 may control the robot cleaner 1 and 1 to return to the charging stand based on the sensed signal which is transmitted from the charging stand. The charging stand may include a signal transmitter (not shown) which transmits a predetermined returning signal.

In another example, by recognizing the current position on the map, the controller 10 may control the robot cleaner 1 and 1' to return to the charging stand. The controller 10 may recognize a position, corresponding to the charging stand, and the current position on the map, and the robot cleaner 1 and 1' may return to the charging stand based on the positions.

The controller 10 may control the robot cleaner 1 and 1' based on information input through a user's terminal (e.g., smartphone, computer, etc.). The robot cleaner 1 and 1' may receive the input information through the communicator 19. Based on the input information, the controller 10 may control a traveling pattern (e.g., traveling in a zigzag path or traveling for intensively cleaning a certain area). Based on the input information, the controller 10 may control whether to activate a specific function (e.g., finding lost articles, repelling insects, etc.). Further, based on the input information, the controller 10 may set a start time of a cleaning traveling mode of the robot cleaner 1 and 1' to a specific time (cleaning reservation function).

The controller 10 includes a mop motor controller 11 which controls driving of the mop motor 61. The controller 10 may include a first mop motor controller 11a which controls driving of a first mop motor 61a. The controller 10 may include a second mop motor controller 11b which controls driving of a second mop motor 61b.

The controller 10 of the robot cleaner 1 according to embodiment A, which will be described later, may further include a sweeping motor controller 12 for controlling driving of a sweeping motor 71 which will be described later.

The controller 10 may control the robot cleaner 1 and 1' based on a reflectance value of the floor which is obtained by a first floor sensor 23a. Specifically, the controller 10 may determine an entry restriction condition based on a first light reflectance value sensed by the first floor sensor 23a, and if the entry restriction condition is satisfied, the controller 10 may control the mop motor 61 to perform a motion corresponding to entry restriction.

Here, the entry restriction condition is satisfied if the first light reflectance value is smaller than a predetermined reference reflectance value; and the entry restriction condition is not satisfied if the first light reflectance value is greater than or equal to the predetermined reference reflectance value.

If the entry restriction condition is satisfied, the controller 10 may perform a motion corresponding to entry restriction. For example, the motion corresponding to entry restriction includes controlling the mop motor 61 to avoid an area which satisfies the entry restriction condition. Here, the avoidance of the area which satisfies the entry restriction condition indicates controlling the mop motor 61 by the controller, so that the mobile robot travels in an area to be cleaned or cleans the area, except the area that satisfies the entry restriction condition.

In another example, the motion corresponding to entry restriction includes attempting to avoid an area which satisfies the entry restriction condition; and if the avoidance is not performed, the motion corresponding to entry restriction includes performing a motion corresponding to avoidance error. The motion corresponding to avoidance error includes a motion of outputting a message or visual information such as picture/symbol, and the like. The motion corresponding to avoidance error may include a motion of outputting a predetermined sound. The motion corresponding to avoidance error may include a motion of halting traveling until the error is resolved. A single motion corresponding to avoidance error may be provided by combining at least one of the above motions.

If the entry restriction condition is not satisfied, the controller 10 may perform normal traveling. The normal traveling refers to performing a predetermined normal motion rather than the motion corresponding to entry restriction.

Accordingly, the mobile robot determines an area, in which the floor has a low reflectance, as a carpet area, and may avoid the area while traveling. In this manner, when a mobile robot, whose traveling force is provided by the rotation of a mop, climbs a carpet, the problem of having difficulty in escaping from the carpet may be solved.

In another example, the controller 10 may control the robot cleaner 1 and 1' based on a reflectance value of the floor which is obtained by the first floor sensor 23a and a second floor sensor 23b. Specifically, the controller 10 may determine an entry restriction condition based on a first light reflectance value, sensed by the first floor sensor 23a, and a second light reflectance value sensed by the second floor sensor 23b; and if the entry restriction condition is satisfied, the controller 10 may control the mop motor 61 to perform a motion corresponding to entry restriction.

Here, the entry restriction condition is satisfied if the first light reflectance value and the second light reflectance value are smaller than a predetermined reference reflectance value; and the entry restriction condition is not satisfied if the first light reflectance value and the second light reflectance value are greater than or equal to a predetermined reference reflectance value. In another example, the entry restriction condition is satisfied if the first light reflectance value is smaller than a predetermined first reference reflectance value, and the second light reflectance value is smaller than a predetermined second reference reflectance value; and the entry restriction condition is not satisfied if the first light reflectance value is greater than or equal to a predetermined first reference reflectance value, and the second light reflectance value is greater than or equal to a predetermined second reference reflectance value.

By measuring the reflectance of the first floor sensor 23a and the second floor sensor 23b, an error in determining a floor material may be reduced.

In yet another example, the controller 10 may control the robot cleaner 1 and 1' based on a reflectance value of the floor, which is obtained by the first floor sensor 23a, and a load value sensed by a first load information sensor 29a. Specifically, the controller 10 may determine an entry restriction condition based on a first light reflectance value, sensed by the first floor sensor 23a, and a first load value sensed by a first load information sensor 29a; and if the entry restriction condition is satisfied, the controller 10 may control the mop motor 61 to perform a motion corresponding to entry restriction.

Here, the entry restriction condition is satisfied if the first light reflectance value is smaller than a predetermined reference reflectance value or if the first load value is greater than a predetermined first reference load value. Further, in another example, the entry restriction condition is satisfied if the first light reflectance value is smaller than the predetermined reference reflectance value and if the first load value is greater than the predetermined first reference load value.

As the floor material is determined by considering the reflectance of the floor and the load of the sweeping part 52, which are obtained by using the first floor sensor 23a and the first load information sensor 29a respectively, an error occurring when determining a floor material by using one factor may be reduced.

In still another example, the controller 10 may control the robot cleaner 1 and 1' based on the reflectance value of the floor, obtained by the first floor sensor 23a, the load value sensed by the first load information sensor 29a, and a second load value sensed by the second load information sensor 29b. Specifically, the controller 10 may determine an entry restriction condition based on the first light reflectance value, sensed by the first floor sensor 23a, the first load value sensed by the first load information sensor 29a, and the second load value sensed by the second load information sensor 29b; and if the entry restriction condition is satisfied, the controller 10 may control the mop motor 61 to perform a motion corresponding to entry restriction.

Here, the entry restriction condition is satisfied if at least one of the following cases occurs: the first light reflectance value is smaller than a predetermined reference reflectance value; if the first load value is greater than a predetermined first reference load value; and if the second load value is greater than a predetermined second reference load value. In another example, the entry restriction condition is satisfied if the first light reflectance value is smaller than the predetermined reference reflectance value, if the first load value is greater than the predetermined first reference load value; and if the second load value is greater than the predetermined second reference load value.

As the floor material is determined by considering the reflectance of the floor and the load of the sweeping part 52 and the load of the spin mop, which are obtained by using the first floor sensor 23a and the first load information sensor 29a respectively, an error occurring when determining a floor material by using one factor may be reduced.

In addition, even when only one of the load of the spin mop, the load of the sweeping part 52, and the first light reflectance value satisfies the entry restriction condition, the mobile robot performs a motion corresponding to entry restriction. Accordingly, it is possible to rapidly determine a case in which any one portion of the mobile robot is stuck in the carpet and the like during various motions, such as rotating motion, forward traveling motion, and the like, and the mobile robot may rapidly avoid such case.

Figure 5:
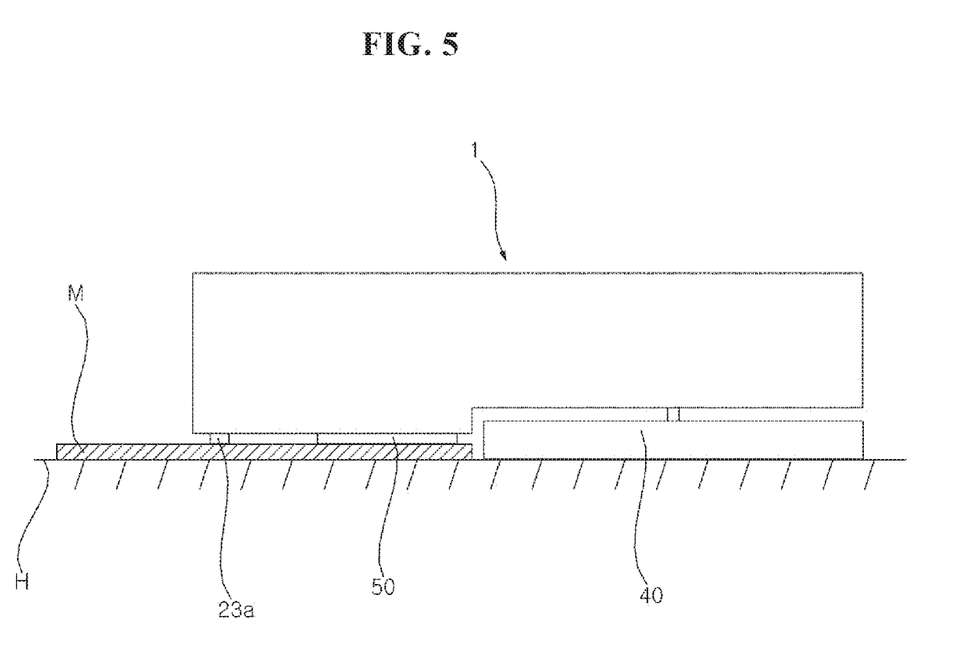
FIG. 5 is a diagram illustrating a portion of the robot cleaner 1 and 1' of the present disclosure climbs a carpet.

FIG. 5 illustrates a case in which a portion (sweeping part 52) of the mobile robot climbs a carpet (M). In the present disclosure, when a portion of the mobile robot climbs the carpet or is very close to the carpet, the mobile robot may avoid the carpet. In this case, the mobile robot may avoid the carpet as the spin mop is still in contact with the floor (H).

Hereinafter, a control method of the robot cleaner 1 and 1' according to first to third embodiments of the present disclosure will be described. The same reference numerals denote the same configurations in the drawings, and the duplicate explanation thereof will be omitted.

The control method may be performed by the controller 10. The present disclosure may be a control method of the robot cleaner 1 and 1' or may be the robot cleaner 1 and 1' including the controller 10 which performs the control method. The present disclosure may be a computer program implementing each step of the control method, or may be a recording medium on which a program for implementing the control method is recorded. The "recording medium" means a computer-readable recording medium. The present disclosure may be a system including both hardware and software.

It will be understood that each block of the block diagrams or flowcharts, and combinations of blocks in the block diagrams or flowcharts, may be implemented at least in part by computer program instructions. These computer program instructions may be loaded into a general purpose computer systems, special purpose hardware, and the like which create means for implementing the functions specified in the block(s) of the block diagrams or flowcharts.

In some embodiments, it is also possible that the functions mentioned in the step may be generated out of order. For example, the two steps shown in succession may be performed substantially concurrently, or the steps may sometimes be performed in reverse order according to a corresponding function.

Figure 6:
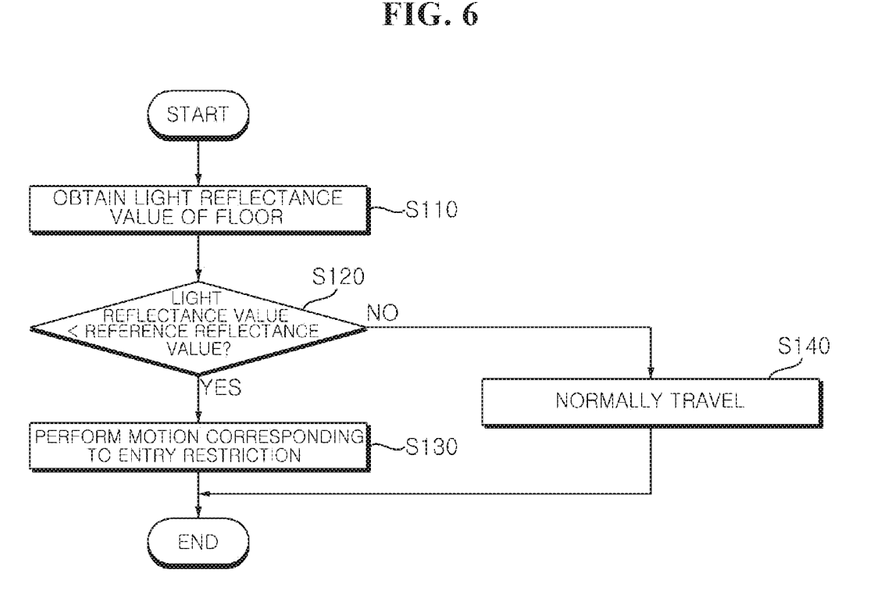
FIG. 6 is a flowchart illustrating a control method of the robot cleaner 1 and 1' according to a first embodiment of the present disclosure.

Referring to FIG. 6, a control method according to a first embodiment includes: obtaining, by the robot cleaner 1 and 1', a first light reflectance value of the floor by using the first floor sensor 23a in S110; determining an entry restriction condition based on the first light reflectance value sensed by the first floor sensor 23a in S120; and in response to the entry restriction condition being satisfied, performing a motion corresponding to entry restriction in S130.

Further, the first embodiment may include, in response to the entry restriction condition not being satisfied, controlling the mobile robot 1 and 1' to normally travel in S140.

Figure 7:
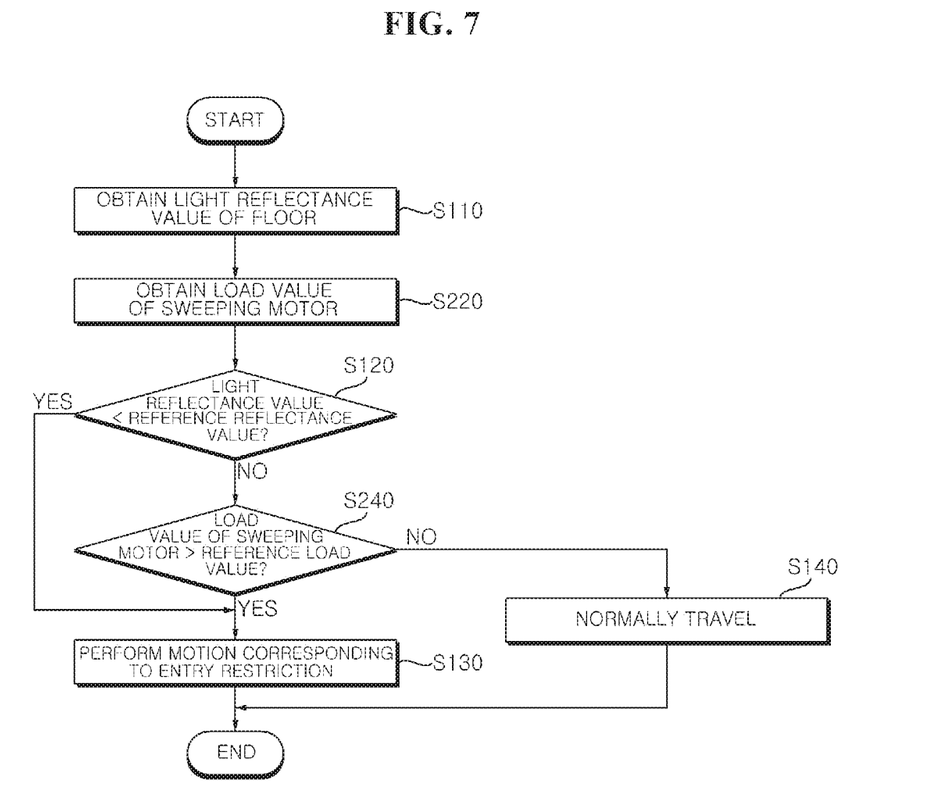
FIG. 7 is a flowchart illustrating a control method of the robot cleaner 1 and 1' according to a second embodiment of the present disclosure.

Referring to FIG. 7, a control method according to a second embodiment includes: obtaining, by the robot cleaner 1 and 1', the first light reflectance value of the floor by using the first floor sensor 23a in S110; obtaining a first load value (load value of the sweeping part 52) by using the first load information sensor 29a in S220; comparing the first light reflectance value, sensed by the first floor sensor 23a, with a reference reflectance value in S120; in response to the first light reflectance value being smaller than the reference reflectance value, performing a motion corresponding to entry restriction in S130; in response to the first light reflectance value being greater than or equal to the reference reflectance value, comparing the first load value with a reference load value in S240; and in response to the first load value being greater than the reference load value, performing a motion corresponding to entry restriction in S130.

Further, the second embodiment may include, in response to the first load value being smaller than or equal to the reference load value, controlling the mobile robot to normally travel in S140.

Figure 8:
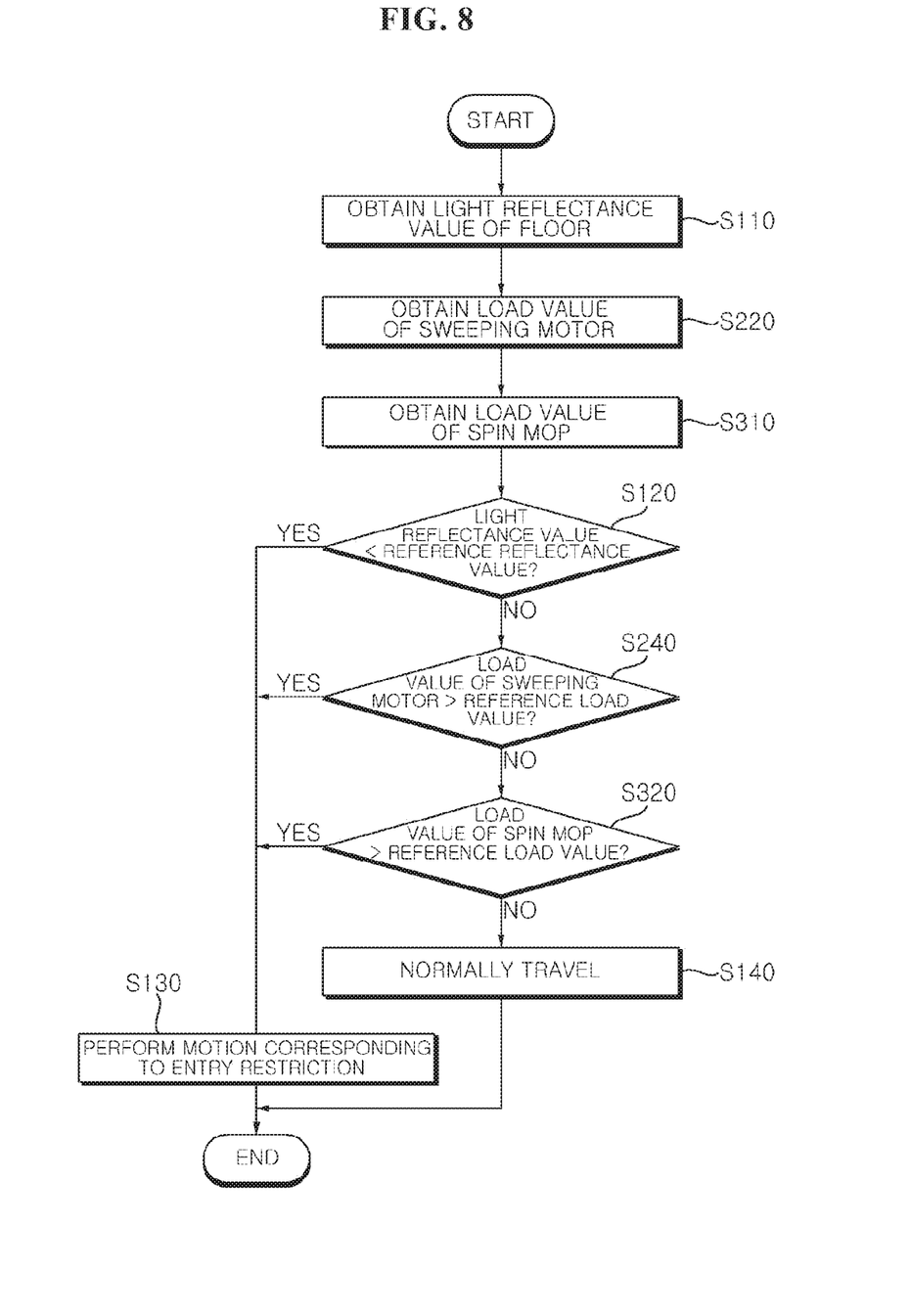
FIG. 8 is a flowchart illustrating a control method of the robot cleaner 1 and 1' according to a third embodiment of the present disclosure.

Referring to FIG. 8, a control method according to a third embodiment includes: obtaining, by the robot cleaner 1 and 1', the first light reflectance value of the floor by using the first floor sensor 23a in S110; obtaining the first load value (load value of the sweeping part 52) by using the first load information sensor 29a in S220; obtaining a second load value (load value of the spin mop) by using the second load information sensor 29b in S310; comparing the first light reflectance value, sensed by the first floor sensor 23a, with the reference reflectance value in S120; in response to the first light reflectance value being smaller than the reference reflectance value, performing a motion corresponding to entry restriction in S130; in response to the first light reflectance value being greater than or equal to the reference reflectance value, comparing the first load value with a first reference load value in S240; in response to the first load value being greater than the first reference load value, performing a motion corresponding to entry restriction in S130; in response to the first load value being smaller than or equal to the first reference load value, comparing the second load value with a second reference load value in S320; and in response to the second load value being greater than the second reference load value, performing a motion corresponding to entry restriction in S130.

Further, the third embodiment may include, in response to the second load value being smaller than or equal to the second reference load value, controlling the mobile robot to normally travel in S140.

As described above, the present disclosure has an effect in that the mobile robot determines an area, in which the floor has a low reflectance, as a carpet area, and avoids the area while traveling, thereby solving the problem of having difficulty in escaping from a carpet when the mobile robot, which moves using torque of a wet mop, climbs the carpet.

Further, by using a plurality of sensors, the mobile robot may estimate a floor material based on at least one of factors of the reflectance of the floor, the load of the sweeping part, and the load of the spin mop or by combining these factors, thereby accurately determining the floor material.

In addition, the present disclosure provides the first floor sensor and the second sensor, which perform existing functions of sensing a cliff and an amount of movement of the mobile robot, and at the same time perform the function of determining the floor material. Accordingly, there is no need to provide a separate sensor, thereby reducing production costs and facilitating a control configuration.

Furthermore, the present disclosure has an effect in that the first floor sensor is disposed forward of the sweep module and the mop module, such that the sweep module and the mop module may avoid a carpet preemptively before load is increased due to the carpet and the like.

Moreover, the present disclosure has an effect in that a sensor for measuring light reflectance of the floor is disposed on a center line in back-and-forth direction thereby securing a maximum sensing range with a minimum number of sensors.

While the present disclosure has been shown and described with reference to the preferred embodiments thereof, it should be understood that the present disclosure is not limited to the aforementioned specific embodiments, and various modifications and variations may be made by those skilled in the art without departing from the scope and spirit of the disclosure as defined by the appended claims, and the modified implementations should not be construed independently of the technical idea or prospect of the present disclosure.

What is claimed is:

1. A mobile robot, comprising:
   a body;
   a mop module disposed on the body and including:
      a pair of spin mops configured to rotate clockwise or counter-clockwise; and
      a mop motor configured to provide a driving force to the pair of spin mops;
   a sweep module disposed on the body forward of and spaced apart from the mop module, the sweep module including:
      a collecting part, including a collecting space to store foreign materials;
      a sweeping part configured to introduce foreign materials into the collecting space while rotating; and
      a sweeping motor configured to provide a driving force to the sweeping part;
      a first floor sensor disposed forward of the sweep module and configured to sense reflectance of light reflected from a floor, wherein the first floor sensor senses a distance from the floor;
   a second floor sensor disposed between the sweep module and the pair of spin mops, the second floor sensor being configured to sense the reflectance of the light reflected from the floor;
   a first load information sensor configured to sense a load value of the sweeping motor;
   a second load information sensor configured to sense a load value of the mop motor; and
   a controller configured to:
      determine an entry restriction condition based on a first light reflectance value sensed by the first floor sensor, a first load value sensed by the first load information sensor and a second load value sensed by the second load information sensor; and
      control the mop motor to perform a motion corresponding to an entry restriction when the entry restriction condition is satisfied.

2. The mobile robot of claim 1, wherein the first floor sensor comprises one of a laser sensor or an infrared sensor.

3. The mobile robot of claim 1, wherein the second floor sensor comprises an optical flow sensor configured to detect an amount of movement of the mobile robot based on an image of the floor.

4. The mobile robot of claim 1, wherein the controller is configured to determine the entry restriction condition further based on a second light reflectance value sensed by the second floor sensor.

5. The mobile robot of claim 4, wherein the entry restriction condition is satisfied when the first light reflectance value and the second light reflectance value are smaller than a predetermined reference reflectance value.

6. The mobile robot of claim 1, wherein the entry restriction condition is satisfied when at least one of the first light reflectance value is smaller than a predetermined reference reflectance value, the first load value is greater than a predetermined first reference load value, and the second load value is greater than a predetermined second reference load value.

7. The mobile robot of claim 1, wherein the entry restriction condition is satisfied when the first light reflectance value is smaller than the predetermined reference reflectance value, the first load value is greater than a predetermined first reference load value, and the second load value is greater than a predetermined second reference load value.

8. The mobile robot of claim 1, wherein the pair of spin mops are symmetrical to each other with respect to a virtual central vertical plane.

9. The mobile robot of claim 1, wherein at least a portion of the first floor sensor vertically overlaps with a virtual central vertical plane.

10. The mobile robot of claim 1, wherein at least portions of the first floor sensor and the second floor sensor vertically overlap with the virtual central vertical plane.

11. The mobile robot of claim 1, wherein the body includes a base forming a bottom surface of the body and the sweep module is disposed in an inner region of the base.

12. The mobile robot of claim 1, wherein the collecting part is disposed forward of the sweeping part.

* * * * *